US011132268B2

United States Patent
Wong et al.

(10) Patent No.: US 11,132,268 B2
(45) Date of Patent: Sep. 28, 2021

(54) SYSTEM AND METHOD FOR SYNCHRONIZING COMMUNICATIONS BETWEEN A PLURALITY OF PROCESSORS

(71) Applicant: THE BOEING COMPANY, Chicago, IL (US)

(72) Inventors: Dick Wong, El Segundo, CA (US); Ronald J. Koontz, Mesa, AR (US); Wing Chung Lee, San Marino, CA (US); Jason Ellis Sherrill, Mesa, AR (US)

(73) Assignee: THE BOEING COMPANY, Chicago, IL (US)

( * ) Notice: Subject to any disclaimer, the term of this patent is extended or adjusted under 35 U.S.C. 154(b) by 64 days.

(21) Appl. No.: 16/658,856

(22) Filed: Oct. 21, 2019

(65) Prior Publication Data

US 2021/0117248 A1 Apr. 22, 2021

(51) Int. Cl.
*G06F 11/16* (2006.01)
*G06F 9/52* (2006.01)
*G06F 13/42* (2006.01)

(52) U.S. Cl.
CPC .......... *G06F 11/1675* (2013.01); *G06F 9/52* (2013.01); *G06F 13/4282* (2013.01); *G06F 2213/0026* (2013.01)

(58) Field of Classification Search
CPC .... G06F 11/1675; G06F 9/52; G06F 13/4282; G06F 2213/0026
See application file for complete search history.

(56) References Cited

U.S. PATENT DOCUMENTS

| 6,708,239 | B1 | 3/2004 | Ellerbrock et al. |
|---|---|---|---|
| 7,581,031 | B2 | 8/2009 | Konz et al. |
| 7,689,699 | B2 | 3/2010 | Chazin |
| 7,739,339 | B2 | 6/2010 | Borys et al. |
| 9,003,405 | B1 | 4/2015 | Horta |
| 9,015,302 | B2 | 4/2015 | Howe |
| 9,438,411 | B1 | 9/2016 | Lojeck et al. |
| 9,760,094 | B2 | 9/2017 | Saad et al. |
| 9,811,455 | B2 | 11/2017 | Ellerbrock et al. |

(Continued)

OTHER PUBLICATIONS

European Patent Application No. 20193739.8, Extended European Search Report dated Mar. 5, 2021.

*Primary Examiner* — Glenn A. Auve
(74) *Attorney, Agent, or Firm* — Alston & Bird LLP

(57) ABSTRACT

A system, method and computer program product synchronize a plurality of processes of one or more applications executed by a plurality of processors. In addition to the processors, the system includes a plurality of memories with each memory associated with a respective process and configured to maintain a local count representative of a message of the respective process with which the memory is associated and at least one remote count representative of a message of a corresponding process executed by another processor. The system also includes a reflector configured to reflect the local count of the respective process to a remote count of the corresponding process. For synchronization, a first process of a first application executed by a first processor is configured to enter a delay period if the local count and at least one remote count maintained by the memory associated with the first process fail to match.

20 Claims, 4 Drawing Sheets

(56) References Cited

U.S. PATENT DOCUMENTS

| | | | |
|---|---|---|---|
| 2002/0152418 A1* | 10/2002 | Griffin | G06F 11/1645 |
| | | | 714/11 |
| 2005/0086652 A1 | 4/2005 | Tian et al. | |
| 2007/0033511 A1* | 2/2007 | Davies | G06F 11/181 |
| | | | 714/799 |
| 2007/0174687 A1* | 7/2007 | Graham | G06F 11/1675 |
| | | | 714/13 |
| 2007/0271010 A1* | 11/2007 | Kossentini | G06F 11/188 |
| | | | 701/14 |
| 2011/0066779 A1* | 3/2011 | Bogenberger | G06F 15/7842 |
| | | | 710/107 |
| 2011/0093838 A1 | 4/2011 | Archambault et al. | |
| 2014/0281120 A1 | 9/2014 | Ellerbrock et al. | |
| 2018/0336157 A1* | 11/2018 | Graffy | G06F 13/423 |
| 2019/0155325 A1 | 5/2019 | Lee et al. | |
| 2020/0319984 A1* | 10/2020 | Bryant | G06F 11/2035 |

\* cited by examiner

SYSTEM AND METHOD FOR SYNCHRONIZING COMMUNICATIONS BETWEEN A PLURALITY OF PROCESSORS

TECHNOLOGICAL FIELD

The present disclosure relates generally to a system, method and computer program product for synchronizing communications between a plurality of processors, such as providing improved synchronization with respect to inbound and/or outbound message processing conducted by concurrent processes or applications executed by the plurality of processors.

BACKGROUND

For any of a wide variety of purposes, multiple processors may concurrently execute the same applications, each of which includes one or more processes. For example, multiple processors may execute the same application to provide enhanced fault tolerance. Alternatively, the results of the concurrent execution of an application by multiple processors may be considered for purposes of integrity monitoring or the like. Furthermore, the concurrent execution of the same application by multiple processors may also be utilized in an instance in which availability of the application is demanded.

The execution of the same applications and, in turn, the same processes, by multiple processors are advantageously synchronized such that different instances of the same process utilize the same data even though the processes are executed by different processors. As such, the inbound and outbound message processing associated with execution of the processes by the plurality of processors should be synchronized. One approach to the synchronization of the inbound and outbound message processing associated with execution of the same process by multiple processors employs network switch loopback. However, this approach introduces significant data latency as well as a requirement for external hardware in the form of the network switch. Another approach for synchronizing inbound and outbound message processing during execution of the same process by multiple processers is reliance upon additional memory that is shared by the plurality of processors. The additional memory also requires the addition of hardware and correspondingly increases the power requirements associated with execution of the same process by the plurality of processors. Furthermore, additional software is generally required to provide mutual access to the shared memory by the plurality of processors executing the same process, thereby increasing the complexity of the system. In this approach, the additional memory is generally sized to accommodate the worst-case skew between the messages processed during the execution of the same process by the plurality of processors, thereby causing the additional memory to be larger than is desired.

BRIEF SUMMARY

A system, method and computer program product are provided in accordance with an example of the present disclosure in order to improve the synchronization between a plurality of processors executing applications that include the same processes, including improved synchronization with respect to inbound and/or outbound message processing conducted by the plurality of processors in conjunction with the execution of the same processes. As a result, the system, method and computer program product of an example of the present disclosure insure that identical data are synchronously provided to and consumed by the processes executed by the plurality of processors, even in instances in which the execution of the processes by the plurality of processors is skewed in time. Further, the system, method and computer program product of an example of the present disclosure require only limited memory and limited or no external hardware in order to synchronize inbound and outbound message processing associated with the processes executed by a plurality of processors.

In an example of the present disclosure, a system is provided that is configured to synchronize communications. The system includes a plurality of processors that are each configured to execute one or more applications with at least one of the applications comprising one or more processes. The system also includes a plurality of memories with each memory associated with a respective process of an application executed by a respective processor. Each memory is configured to maintain a local count representative of a message communicated to or from the respective process with which the respective memory is associated and at least one remote count representative of the message communicated to or from a corresponding process of an application executed by another one of the plurality of processors. The system further includes a reflector configured to reflect the local count of the respective process to a remote count of the corresponding process on the plurality of other processors. To maintain synchronization, a first process of a first application executed by a first processor is configured to enter a delay period in an instance in which the local count and at least one remote count maintained by the memory associated with the first process fail to match.

The first process of an example is configured to enter the delay period in an instance in which the local count exceeds at least one remote count and is also configured to continue execution in an instance in which the local count matches the remote count of the corresponding process. In an example, a memory location at which the memory associated with the corresponding process of the application executed by the other processor maintains the remote count is identified by hardware addressing. In another example, the memory location at which the memory associated with the corresponding process of the application executed by the other processor maintains the remote count is identified by a Peripheral Component Interconnect Express (PCIe) address. As used herein, PCIe is an interface standard for connecting high-speed components as defined by PCI-SIG Administration of Beaverton, Oreg. 97003, USA The plurality of processors may operate asynchronously due to clocking or operational differences. The plurality of processors may include a plurality of dissimilar processors that operate independently due to architectural or clocking differences. In an example, the plurality of processors include a plurality of multi-core processors with each core of a multi-core processor configured to execute one or more applications with at least one of the applications comprising one or more processes. In an instance in which the first process of the first application executed by the first processor enters the delay period, one or more other processes of the first application executed by the first processor continue without delay.

In another example of the present disclosure, a method is provided for synchronizing communications. The method includes processing a plurality of messages with each of one or multiple processes of one or more applications executed by each of a plurality of processors. For a respective process of an application executed by a respective processor, the method includes maintaining a local count and at least one remote count in a memory associated with the respective process. The local count is representative of the message communicated to or from the respective process with which the respective memory is associated. The at least one remote count is representative of the message communicated to or from a corresponding process of an application executed by another one of the plurality of processors. The method also includes reflecting the local count of the respective process to a remote count of the corresponding process. The method further includes causing a first process of a first application executed by a first processor to enter a delay period in an instance in which the local count and at least one remote count maintained by the memory associated with the first process fail to match.

The method of an example causes the first process to enter the delay period by causing the first process to enter the delay period in an instance in which the local count exceeds at least one remote count. In this example, the method further includes continuing to process the plurality of messages with the first process in an instance in which the local count matches the remote count of the corresponding process. In an example, the method reflects the local count by identifying a memory location at which the memory associated with the corresponding process of the application executed by the other processor maintains the remote count by hardware addressing. In this example, the method identifies the memory location by hardware addressing by identifying the memory location at which the memory associated with the corresponding process of the application executed by the other processor maintains the remote count by a PCIe address. The method may process the plurality of messages by operating the plurality of processors asynchronously due to clocking or operational differences. In an example, the method reflects the local count by reflecting the local count in an asynchronous manner.

In a further example of the present disclosure, a computer program product is provided that is configured to synchronize communications. The computer program product includes a non-transitory computer readable medium having program code stored thereon with the program code comprising program code instructions configured, upon execution, to process a plurality of messages with each of one or more processes of one or more applications executed by each of a plurality of processors. The program code also includes program code instructions configured to maintain a local count and at least one remote count in a memory associated with a respective process of an application executed by a respective processor. The local count is representative of the message communicated to or from the respective process with which the respective memory is associated, while the at least one remote count is representative of the message communicated to or from a corresponding process of an application executed by another one of the plurality of processors. The program code further includes program code instructions configured to reflect the local count of the respective process to a remote count of the corresponding process and program code instructions configured to cause the first process of a first application executed by a first processor to enter a delay period in an instance in which the local count and at least one remote count maintained by the memory associated with the first process fail to match.

The program code instructions configured to cause the first process to enter the delay period in accordance with an example include program code instructions configured to cause the first process to enter the delay period in an instance in which the local count exceeds at least one remote count. In this example, the program code also includes program code instructions configured to continue to process the plurality of messages with the first process in an instance in which the local count matches the remote count of the corresponding process. In an example, the program code comprising program code instructions configured to reflect the local count include program code instructions configured to identify a memory location at which the memory associated with the corresponding process of the application executed by the other processor maintains the remote count by hardware addressing. In this example, the program code instructions configured to identify the memory location by hardware addressing may include program code instructions configured to identify the memory location at which the memory associated with the corresponding process of the application executed by the other processor maintains the remote count by a PCIe address. The program code instructions configured to process the plurality of messages may include program code instructions configured to process the plurality of messages asynchronously relative to processing of the plurality of messages by other processors of the plurality of processors due to clocking or operational differences. The program code instructions configured to reflect the local count may include program code instructions configured to reflect the local count in an asynchronous manner.

BRIEF DESCRIPTION OF THE DRAWINGS

Having described certain examples of the present disclosure in general terms above, reference will now be made to the accompanying drawings, which are not necessarily drawn to scale and wherein.

DETAILED DESCRIPTION

Some examples of the present disclosure will now be described more fully hereinafter with reference to the accompanying drawings, in which some, but not all examples of the present disclosure are shown. Indeed, these examples may be embodied in many different forms and should not be construed as limited to the examples set forth herein; rather, these examples are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with examples of the present disclosure. Thus, use of any such terms should not be taken to limit the spirit and scope of examples of the present disclosure.

A system, method and computer program product are provided in accordance with an example of the present disclosure in order to synchronize communications, such as communications between a plurality of processors. As used herein, reference to synchronization refers to time synchronization. The plurality of processors may be executing the same application, such as for fault tolerance purposes, for purposes of integrity and/or for increasing the availability of the application. At least some of the applications executed by the plurality of processors may include a plurality of processes, e.g., tasks or threads, that are executed concurrently and may run at different rates. Thus, the plurality of processors may be executing one or more of the same processes concurrently. For various reasons including, for example, drifting of a clock source of one or more of the processors, the plurality of processors executed by different processors may become asynchronous. In this instance, the execution of the same process of an application by the plurality of processors may no longer generate identical results due to different data input. For example, the time difference between execution of the same process by the plurality of processors may cause the processes to operate on different instances of the same data elements, thereby producing different results. To reduce such asynchronous operation of the plurality of processes, the system, method and computer program product of an example of the present disclosure encourage synchronized communications between the plurality of processors and correspondingly synchronized execution of the processes of the applications by the plurality of processors. In an instance in which the processes are no longer synchronized, the method, apparatus and computer program product cause the processors to return to synchronization in relation to the execution of the processes by the processors.

Figure 1:
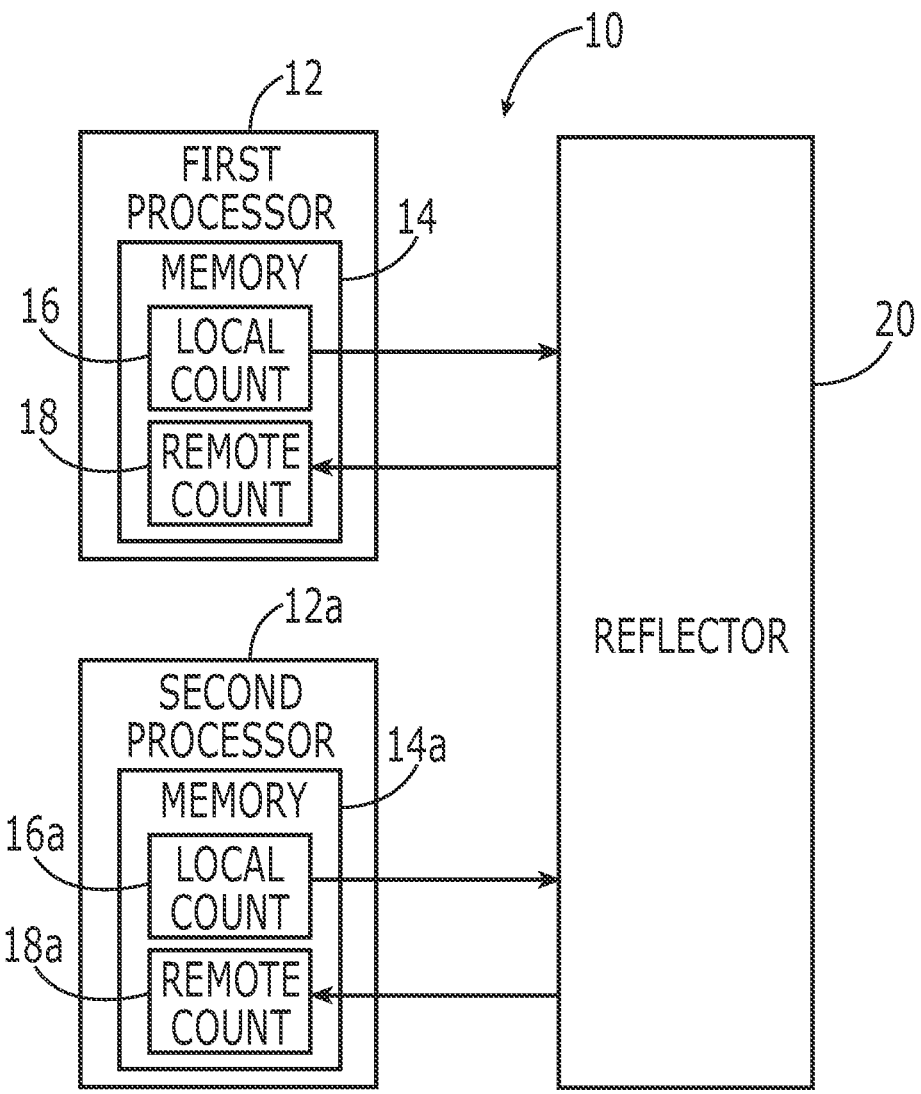
FIG. 1 is a block diagram of a system configured to synchronize communications between a plurality of processors in accordance with an example of the present disclosure.

Referring now to FIG. 1, a system 10 that is configured to synchronize communications between a plurality of processors 12, 12a is depicted. The system 10 includes a plurality of processors 12, 12a and a plurality of memories 14, 14a with at least one memory associated with each of the plurality of processors. Although the system 10 of FIG. 1 is shown to include two processors, designated the first processor 12a and the second processor 12b, the system of other examples may include other numbers of processors, such as three or more processors. As also shown in FIG. 1, the plurality of processors 12, 12a may include or otherwise embody respective memories 14, 14a or one or more of the memories may be external to the respective processors while remaining in communication therewith. As described below, the system 10 of an example includes at least two memory locations, e.g., registers, associated with each of the plurality of processors 12, 12a with one memory location configured to maintain a local count 16, 16a and another memory location configured to maintain a remote count 18, 18a. As shown in FIG. 1, both memory locations for maintaining the local count 16, 16a and remote count 18, 18a for a respective processor 12, 12a may be provided by a single memory device 14, 14a. However, a processor 12, 12a of another example may include or otherwise be in communication with separate memory devices 14, 14a, one of which is configured to store the local count 16, 16a and another one of which is configured to store the remote count 18, 18a.

The plurality of processors 12, 12a of an example are configured to operate synchronously and, as such, may be clocked by the same clock source. In other examples, however, the plurality of processors 12, 12a are configured to operate asynchronously, such as by being clocked by different clock sources. The plurality of processors 12, 12a may include a plurality of the same type of processors. Alternatively, the plurality of processors 12, 12a may be embodied by a plurality of different types of processors, that is, the processors may be dissimilar processors (having different internal hardware architectures). In one example, the plurality of processors 12, 12a include a plurality of multi-core processors. The processors 12, 12a are each configured to execute one or more applications, at least some of which are to be synchronized. At least some of the applications may include one or more processes, e.g., tasks or threads. In an example, two or more of the processes of an application may execute concurrently, even though the processes may run at different periodic rates or even aperiodically. In an instance in which the system 10 includes a plurality of multi-core processors, each application may be executed in a partition on a particular core of a respective processor. As a result, the same application and, in turn, the same process may be executed by a respective core of two or more of the multi-core processors of this example.

As shown in FIG. 1, the system 10 also includes a reflector 20. The reflector 20 may be embodied by a hardware component. In the illustrated example in which the plurality of processors 12, 12a include first and second processors, the reflector is configured to reflect the local count 16 of the first processor to the remote count 18a of the second processor and to correspondingly reflect the local count 16a of the second processor to the remote count 18 of the first processor. In an alternative example in which the system 10 includes three or more processors 12, 12a, the processors are configured to maintain a remote count 18, 18a for each of the plurality of other processors and the reflector 20 is correspondingly configured to reflect the local count 16 of the first processor to the corresponding remote count associated with the first processor that is stored by the memory 14 associated with each of the other processors, such as the remote count 18a of the first processor stored by the second processor, the remote count of the first processor stored by the third processor, the remote count of the first processor stored by the fourth processor and so on. The reflector 20 may be configured in various manners. In an example, the reflector 20 is embodied as a network controller, such as a synchronizing interface network controller (SINC). In this example, the SINC may be embodied by an application-specific integrated circuit (ASIC) or a field programmable gate array (FPGA).

Figure 2:
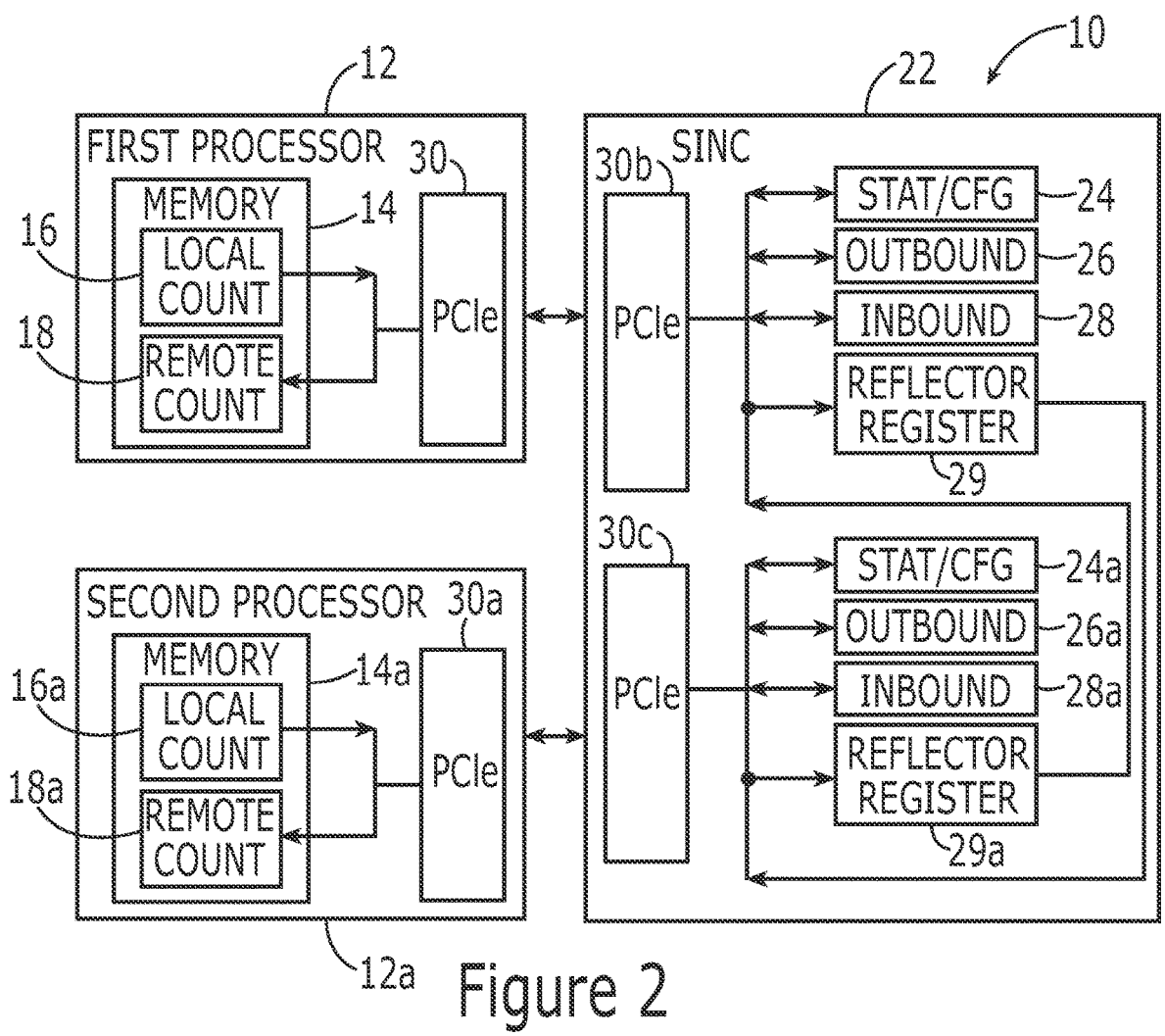
FIG. 2 is a more detailed block diagram of a system configured to synchronize communications between a plurality of processors in accordance with an example of the present disclosure.

In an instance in which the reflector 20 is embodied as a SINC 22, FIG. 2 provides a more detailed view of a system 10 for synchronizing communications between the plurality of processors 12, 12a, such as between first and second processors in this illustrated example. As described above, each processor 12, 12a includes or is associated with a memory 14, 14a that, in turn, maintains a local count 16, 16a and a remote count 18, 18a in respective memory locations. The illustrated set of the local count 16, 16a and the remote count 18, 18a is associated with a respective process of an application executed by a processor 12, 12a. As the processor 12, 12a may execute a plurality of processes of one or more applications, the memory 14, 14a associated with a processor may include a plurality of sets of the local count 16, 16a and the remote count 18, 18a, one set of which is associated with each process. The local count 16, 16a of a respective process serves as a transaction counter, thereby identifying the respective message number that is currently being communicated to or from the process or that was most recently communicated to or from the process. For example, following transmission or reception of the first message by the respective process, the processor 12, 12a may set the local count 16, 16a to value one. Following the transmission or reception of the tenth message by the respective process, the processor 12, 12a may correspondingly set the local count 16, 16a to value ten and so on. Similarly, the remote count 18, 18a maintained by a processor 12, 12a is a representation of the message executed by another process, that is, a corresponding process, of an application executed by another processor, such as the second processor in this example. Since the processors 12, 12a are executing the same applications and, in turn, the same processes, the local count 16, 16a and the remote count 18, 18a should be the same in an instance in which the processors are synchronized. However, in an instance in which the processors 12, 12a are not synchronized, the local count 16, 16a and the remote count 18, 18a will contain different values, thereby causing the system 10 of this example to take action to bring the processors and, more particularly, the processes of the processors back into synchronization.

The reflector 20, such as embodied in the SINC 22, of the example depicted in FIG. 2 reflects the local count 16 of a respective process of an application executed by the first processor 12 to the remote count 18a of the same process of the same application executed by the second processor 12a and, conversely, reflects the local count 16a of a respective process of an application executed by the second processor to the remote count 18 of the same process of the same application executed by the first processor. Thus, a set of a local count 16, 16a and a remote count 18, 18a represents respective counts of the messages transmitted to and from the same process of the same application executed by different processors 12, 12a. The reflector 20 of an example is configured to perform this reflection in real time or near real time to permit a meaningful comparison between the local count 16, 16a and remote count 18, 18a maintained by a respective processor 12, 12a without the remote count being time-delayed or time-shifted to an appreciable extent as a result of time required for the reflection process.

Although the reflector 20 may be embodied in a variety of different manners, the SINC 22 of the illustrated example of FIG. 2 includes a plurality of groups of registers with one group of registers associated with each process of an application of the plurality of processors 12, 12a. As such, each group of registers is associated with a corresponding set of a local count 16, 16a and a remote count 18, 18a of a respective process of an application executed by a processor 12, 12a. For example, a first group of registers is associated with a respective process of an application executed by the first processor and a second group of registers is associated with a corresponding process of an application, that is, the same process of the same application, executed by the second processor. Although the SINC 22 of FIG. 2 includes only two groups of registers, the reflector may include any number of groups of registers with each group of registers associated with a different, respective process of an application executed by a processor 12, 12a. Each group of registers may include a status/configuration register 24, 24a, an outbound register 26, 26a and an inbound register 28, 28a with the outbound and inbound registers being utilized to transfer data to and from other external devices. The group of registers also includes the reflector in the form of at least one reflector register 29, 29a as described below. In this regard, the group of registers associated with a process of an application executed by one processor 12, 12a may include one reflector register 29, 29a configured to communicate with each of the other processors that are executing the same application and, in turn, the corresponding, e.g., the same, process.

In the example of FIG. 2, for example, the reflector register 29, 29a associated with a process of an application executed by the first processor 12 is configured to communicate with the second processor 12a that is executing the same application and, in turn, the corresponding process and the reflector register associated with the corresponding process of the same application executed by the second processor is configured to communicate with the first processor. In other examples that include three or more processors 12, 12a, the group of registers associated with a process of an application executed by one processor may include a plurality of reflector registers 29, 29a, one of which is configured to communicate with each of the other processors that are executing the same application and, in turn, the corresponding, e.g., the same, process. By way of an example in which the system 10 includes three processors 12, 12a, the group of registers associated with a process of an application executed by the first processor may include a first reflector register 29 configured to communicate with the second processor and a second reflector register configured to communicate with the third processor in an instance in which both the second and third processors execute the same application and, in turn, the corresponding process. Similarly, the group of registers associated with the corresponding process of the same application executed by the second processor 12a may include a first reflector register 29a configured to communicate with the first processor 12 and a second reflector register configured to communicate with the third processor and the group of registers associated with the corresponding process of the same application executed by the third processor may include a first reflector register configured to communicate with the first processor 12 and a second reflector register configured to communicate with the second processor 12a.

Each reflector register 29, 29a is configured to receive the local count 16, 16a maintained by the memory 14, 14a of the processor 12, 12a that is executing the application and, in turn, the process with which the respective reflector register is associated. As shown in FIG. 2, each reflector register 29, 29a is also in communication, such as in hardware communication, with the remote count 18, 18a maintained by the memory 14, 14a of other processor 12, 12a with which the reflector register is configured to communicate. In relation to the example depicted in FIG. 2, the value of the reflector register 29 associated with the process of the application executed by the first processor 12, that is, the local count 16 stored by the memory 14 of the first processor, is provided to the memory location of the memory 14a of the second processor 12a that maintains the remote count 18a, thereby providing for memory mapped input/output which may be dynamically allocated in one example. Conversely, the value of the reflector register 29a associated with the corresponding process of the same application executed by the second processor 12a, that is, the local count 16a stored by the memory 14a of the second processor, is provided to the memory location of the memory 14 of the first processor 12 that maintains the remote count 18. In other words, the first processor 12 of this example writes the value of the local count 16 from the memory 14 associated with the first processor to the reflector register 29 associated with the respective process which, in turn, passes the value to the memory 14a associated with the corresponding process of the same application executed by the second processor 12a to be stored as the value of the remote count 18a. In other examples that include three or more processors 12, 12a, the local count of one processor is reflected through respective reflector registers 29, 29a to the corresponding remote count of each of the other processors that are executing the same application and, in turn, the same process.

Regardless of the number of processors 12, 12a, the reflector 20 may be configured to operate asynchronously such that the local counts 16, 16a provided by the respective processors 12, 12a may be passed to and reflected to the remote counts 18, 18a of the other processor in real time with minimal delay such that the reflector of an example need not be clocked. In this regard, the memory location at which the memory 14, 14a associated with a processor 12, 12a maintains the remote count 18, 18a may be identified, such as by the reflector 20, by hardware addressing. Although various hardware addressing techniques may be utilized, the reflector 20, such as the network controller of an example, utilizes PCIe addressing 30, 30a, 30b, 30c as shown in FIG. 2 with respect to the processors 12, 12a and the reflector 20 in order to identify the memory location at which the other processor maintains the remote count 18, 18a, thereby minimizing latency in conjunction with the reflection of the value of the local count 16, 16a to the remote count.

The reflection of the value of a local count 16, 16a of one processor 12, 12a to the remote count 18, 18a of one or more other processors may be defined or controlled by one or more parameters. These parameters may be defined in advance as a result of a static configuration, may be defined on the fly in conjunction with the transmission of messages to and from the reflector 20 or by some combination thereof in which some parameters are defined in advance, such as a result of a static configuration, and other parameters are defined in conjunction with the transmission of messages to and from the reflector. The parameters may include an identification of the reflector register 29, 29a, the address(es) of the other processor(s) 12, 12a and/or the number of words to be written by one processor to the other processor(s). Another parameter may be an offset parameter that defines an offset, such as a PCIe address offset, from a fixed address at which the memory location associated with another processor and configured to store a remote count 18, 18a is located. An additional parameter may be a timeout value that defines the length of time during which the other processor is permitted to increment its counter with action being taken in an instance in which the other processor fails to increment its counter within a time period defined by the timeout value, thereby permitting a processor stuck in the delay period to be identified and appropriate remedial action to be taken. By permitting the various parameters to be defined statically in advance or dynamically (on the fly) in conjunction with the exchange of messages, the system 10, method and computer program product of an example provide flexibility in terms of the plurality of processors 12, 12a and the communication therebetween.

Figure 3:
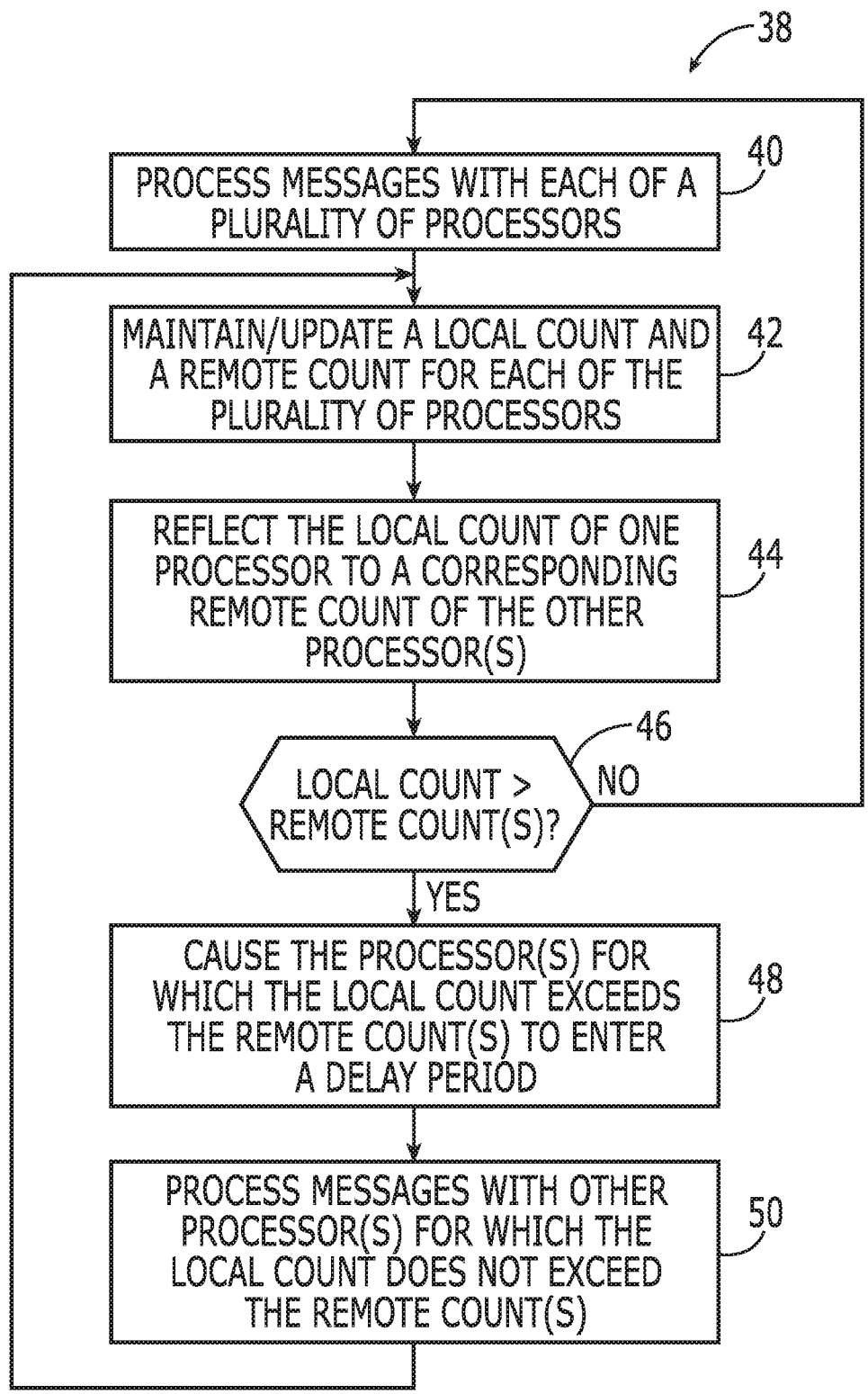
FIG. 3 is a flow chart illustrating operations performed, such as by the system of FIG. 1 or 2, in accordance with an example of the present disclosure.

Referring now to FIG. 3, the operations performed, such as by the system 10 of FIG. 1 and, in some examples, FIG. 2, are illustrated in a method 38. As shown in block 40, the system 10, such as the plurality of processors 12, 12a, is configured to process a plurality of messages of the same process with each of the plurality of processors. In this regard, each of the plurality of processors is configured to execute the same application(s) and, in turn, the same process(es) of the same application(s) concurrently. For the same process executed by each processor 12, 12a of the plurality of processors, a local count 16, 16a and at least one remote count 18, 18a is maintained in a memory 14, 14a associated with the respective processor. In this regard, a local count 16, 16a may be maintained to count, for example, the number of messages communicated to or from (or, more generally, the number of messages processed as may be measured, for example, by the number of instructions executed or some other measure of the extent of processing pursuant to the process of the application) the process by the respective processor 12, 12a and a remote count 18, 18a may be maintained for the corresponding process of the same application executed by one or more of the other processors, such as by maintaining a separate remote count value for the corresponding process of the same application executed by each of the other processors. Like the local count 16, 16a, the remote count 18, 18a may be configured to count, for example, the number of messages communicated to or from (or, more generally, processed such as in terms of the number of instructions executed or some other measure of the extent of processing pursuant to the application) by the corresponding process of another processor 12, 12a. For a respective process of an application, a processor 12, 12a may maintain a number of local counts 16, 16a and remote counts 18, 18a that equals the number of instances of the process of the application executed by the processors. Thus, the number of remote counts 18, 18a maintained by a processor 12, 12a is generally one less than the total number of instances of the respective process of the application executed by the processors. In conjunction with a respective process, for example, in a system 10 that includes three processors 12, 12a that each execute the same application and, in turn, the same respective process, each processor would maintain a local count 16, 16a and two remote counts 18, 18a with each remote count value representative of the local count associated with the respective process of the application executed by a respective one of the other processors. As described above and as shown in block 42 of FIG. 3, the method 38 includes for a respective process of an application executed by a respective processor, maintaining 42 a local count 16, 16a and at least one remote count 18, 18a in a memory 14, 14a associated with the respective process, wherein the local count is representative of the message communicated to or from the respective process with which the respective memory is associated, and wherein the at least one remote count is representative of the message communicated to or from a corresponding process of an application executed by another one of the plurality of processors.

As shown in block 44 of FIG. 3, the system 10, such as the reflector 20, is configured to reflect the local count 16, 16a of a process of an application executed by one processor 12, 12a to a corresponding remote count 18, 18a of another processor that is executing the same application and, in turn, a corresponding, that is, the same, process. In an instance in which the system 10 includes three or more processors 12, 12a, the local count 16, 16a of a process of an application executed by one processor is reflected to a corresponding remote count 18, 18a maintained by each of the other processors that are executing the same application including the corresponding process. As shown in decision block 46 of FIG. 3, the system 10, such as each respective processor 12, 12a, determines whether the local count 16, 16a maintained by the processor is greater than the remote count 18, 18a maintained by the same processor or, in an example that includes three or more processors, whether the local count of the processor is greater than any one of the plurality of remote counts maintained by the same processor. In an instance in which the local count 16, 16a maintained by the processor 12, 12a is equal to or less than the remote count 18, 18a maintained by the same processor, or, in an instance in which the system 10 includes three or more processors and the local count maintained by the processor is equal to or less than each of the plurality of remote counts maintained by the same processor for the other processors, the processor continues to process the next message, such as by providing for communication of the message to or from the processor, the decision is yes and the flow of method 38 returns to block 40 of FIG. 3.

However, in an instance in which the local count 16, 16a maintained by the processor 12, 12a exceeds the remote count maintained by the same processor, or, in an example of the system 10 that includes three or more processors and in which the local count maintained by the processor exceeds the remote count maintained by the same processor for any of the other processors, the decision is no and the process(es) executed by the respective processor(s) for which the local count exceeds the remote count(s) is (are) caused to enter a delay period, as shown in block 48 of FIG. 3. Upon entry to the delay period, the respective processor(s) 12, 12a does not process the next message of the process, such as by preventing communication of the next message to or from the respective processor, but instead enters an idle state, while one or more of the other processors (namely, the other processor(s) for which the remote count 18, 18a maintained by the respective processor is less than the local count 16, 16a maintained by the same processor) continue with execution of the application and, more particularly, the process by processing the next message of the process, such as by providing for communication of the next message to or from the one or more other processors, as shown in block 50 of FIG. 3. Although the particular process of the respective processor is in the delay period, other processes running in parallel on the respective processor, such as other processes executed by other cores of a multi-core processor, are not delayed and continue to execute. Following processing of the next message of the process by one or more of the other processors 12, 12a and the reflection of the local count(s) 16, 16a of the other processor(s) to the corresponding remote count(s) 18, 18a maintained by the respective processor, the comparison of the local count maintained by the respective processor to the remote count maintained by the same processor, or, in an example that includes three or more processors, the comparison of the local count maintained by the respective processor to the remote counts maintained by the same processor for each of the other processors is repeated to determine if the local count remains greater than the remote count or, in an instance in which the system includes three or more processors, greater than at least one of the remote counts. If the local count 16, 16a maintained by the respective processor 12, 12a remains greater than at least one of the remote counts 18, 18a maintained by the same processor, the respective processor remains in a delay period while one or more of the other processors (those associated with a remote count(s) maintained by the respective processor that exceeds the local count maintained by the same processor) continue to execute the application by processing the next message, such as by providing for communication of the next message to or from the one or more other processors. However, in an instance in which the other processor(s) 12, 12a has caught up with the respective processor such that the remote count(s) 18, 18a maintained by the respective processor equals the local count 16, 16a maintained by the same processor, the delay period of the respective processor concludes and the respective processor as well as the other processor(s) continue with execution of the application by processing the next message, such as by providing for communication of the next message to or from the processors.

The operations described above in conjunction with FIG. 3 are performed in accordance with an example by each of the processors 12, 12a. In other words, while described above in conjunction with a delay period instituted in conjunction with one of the processors 12, 12a, the local count 16, 16a and the remote count(s) 18, 18a maintained by the memory 14, 14a associated with each processor are compared by each respective processor such that any one or more of the plurality of processors is configured to enter into a delay period in an instance in which the local count maintained by the respective processor exceeds the remote count(s) maintained by the same processor for the other processor(s).

Figure 4:
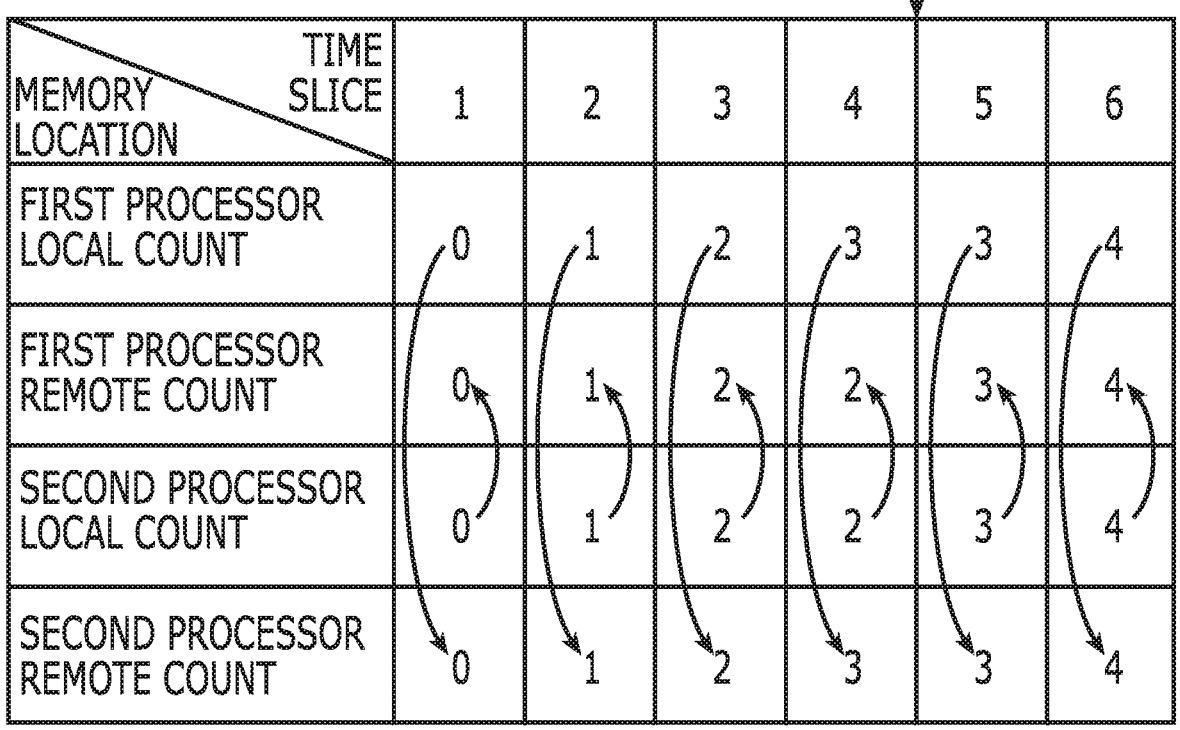
FIG. 4 is a chart representing the local remote counts maintained by two different processors and illustrative of a delay period entered by one of the processors in response to a mismatch between the local and remote counts in accordance with an example of the present disclosure.

By way of example of the entry into a delay period in order to permit a plurality of processors 12, 12a to return to synchronization in relation to the processing of messages associated with this execution of the same process of the same application(s), FIG. 4 depicts the operations performed by first and second processors that are executing the same application and, more particularly, the same process of the same application for multiple consecutive time slices as well as the values of the local count 16, 16a and remote count 18, 18a maintained by each of the first and second processors at each of the time slices. At time slice 1, each of the first and second processors processes a first message in conjunction with the execution of the same application and, in turn, the same process. The initial values of the local and remote counts maintained by each of the first and second processors match one another, since the local and remote counts are all 0 during time slice 1. Following the processing of the first message, the local counts maintained by the first and second processors are updated in time slice 2 so as to be 1 and the values of the local count of each processor are reflected to the remote count of the other processor such that the remote counts of the first and second processors now also are 1. During time slice 2 of the process, each of the first and second processors then processes the next message since the values of the local and remote counts of each of the first and second processors continue to be equal. The local and remote counts are then updated in time slice 3 to be 2 and the first and second processors process the next message in conjunction with the execution of the same application and, in turn, the same process during time slice 3 since the local and remote counts of each of the first and second processors continue to remain the same.

As shown in time slice 4 of the process, the first processor has processed the third message resulting in a local count of 3 that is reflected to the remote count of the second processor. However, the second processor has not yet processed the third message of the process such that the local count of the second processor remains at 2, which continues to be reflected to the remote count maintained by the first processor. Since the local count of the first processor exceeds the remote count maintained by the first processor in time slice 4 of the process, the first processor enters a delay period so as not to process the next message during the time slice 4. Although the first processor enters the delay period, other processes running in parallel on the first processor, such as other processes executed by other cores of a multi-core processor, are not delayed and continue to execute. However, since the local count of the second processor is not greater than the remote count maintained by the second processor (but is instead less than the remote count maintained by the second processor), the second processor processes the next message during time slice 4 of the process. As a result of having processed the next message of the process, the local count maintained by the second processor increments to 3 in time slice 5 which, in turn, is reflected to the remote count maintained by the first processor. Since the local and remote counts maintained by each of the first and second processors again equal one another, the delay period of the first processor concludes and both the first and second processors process the next message in time slice 5 of the process, thereby resulting in local and remote counts incrementing to 4 for each of the first and second processors in time slice 6 of the process, thereby permitting both the first and second processors to continue to process the next message, such as by providing for communication of the next message to or from the processors.

As the example depicted in FIG. 4 illustrates, the system 10, method and computer program product of an example permit the plurality of processors 12, 12a to remain synchronized with respect to inbound and/or outbound message processing, such as the transmission or reception of messages, conducted by the plurality of processors in conjunction with the execution of the same applications and, in turn, the same processes, even in instances in which the processors are operating asynchronously or otherwise become out of step relative to a common clock. By ensuring synchronous communications by the plurality of processors 12, 12a, the execution of the same application including the same process(es) by the plurality of processors should produce the same results, thereby providing for improved fault tolerance, integrity and availability for the application. Further, the system 10, method and computer program product of an example require only limited memory and limited or no external hardware in order to synchronize inbound and outbound message processing associated with the processes executed by a plurality of processors, thereby reducing the complexity as well as the power requirements of the system. In this regard, the system 10 of an example may limit the amount of memory required for each processor 12, 12a to store the messages being processed to that required to store two messages, as opposed to having to be sized much larger in order to accommodate the worst-case of skew in prior approaches.

FIG. 3 illustrates a flowchart describing the operation of systems, methods, and computer program products according to the disclosure. It is understood that each block of the flowchart, and combinations of blocks in the flowchart, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory 14, 14a and executed by the corresponding processer 12, 12a. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowchart, and combinations of blocks in the flowchart, can be implemented by special purpose hardware-based computer systems which perform the specified functions, or combinations of special purpose hardware and software instructions.

In some examples, some of the operations above may be modified or further amplified. Furthermore, in some examples, additional optional operations may be included. Modifications, amplifications, or additions to the operations above may be performed in any order and in any combination.

Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation. Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

What is claimed is:

1. A system configured to synchronize communications, the system comprising:
   a plurality of processors that are each configured to execute one or more applications with at least one of the applications comprising one or more processes;

a plurality of memories with each memory associated with a respective process of an application executed by a respective processor, wherein each memory is configured to maintain a local count representative of a message communicated to or from the respective process with which the respective memory is associated and at least one remote count representative of the message communicated to or from a corresponding process of an application executed by another one of the plurality of processors; and a reflector configured to reflect the local count of the respective process to a remote count of the corresponding process, wherein a first process of a first application executed by a first processor is configured to enter a delay period in an instance in which the local count and at least one remote count maintained by the memory associated with the first process fail to match.

2. The system of claim 1 wherein the first process is configured to enter the delay period in an instance in which the local count exceeds at least one remote count and is also configured to continue execution in an instance in which the local count matches the remote count of the corresponding process.

3. The system of claim 1 wherein a memory location at which the memory associated with the corresponding process of the application executed by the other processor maintains the remote count is identified by hardware addressing.

4. The system of claim 3 wherein the memory location at which the memory associated with the corresponding process of the application executed by the other processor maintains the remote count is identified by a PCIe address.

5. The system of claim 1 wherein the plurality of processors operate asynchronously due to clocking or operational differences.

6. The system of claim 1 wherein the plurality of processors comprise a plurality of dissimilar processors that operate independently due to architectural or clocking differences.

7. The system of claim 1 wherein the plurality of processors comprise a plurality of multi-core processors with each core of a multi-core processor configured to execute one or more applications with at least one of the applications comprising one or more processes.

8. The system of claim 1 wherein, in an instance in which the first process of the first application executed by the first processor enters the delay period, one or more other processes of the first application executed by the first processor continue without delay.

9. A method for synchronizing communications, the method comprising:

processing a plurality of messages with each of one or more processes of one or more applications executed by each of a plurality of processors;

for a respective process of an application executed by a respective processor, maintaining a local count and at least one remote count in a memory associated with the respective process, wherein the local count is representative of the message communicated to or from the respective process with which the respective memory is associated, and wherein the at least one remote count is representative of the message communicated to or from a corresponding process of an application executed by another one of the plurality of processors;

reflecting the local count of the respective process to a remote count of the corresponding process; and causing a first process of a first application executed by a first processor to enter a delay period in an instance in which the local count and at least one remote count maintained by the memory associated with the first process fail to match.

10. The method of claim 9 wherein causing the first process to enter the delay period comprises causing the first process to enter the delay period in an instance in which the local count exceeds at least one remote count, and wherein the method further comprises continuing to process the plurality of messages with the first process in an instance in which the local count matches the remote count of the corresponding process.

11. The method of claim 9 wherein reflecting the local count comprises identifying a memory location at which the memory associated with the corresponding process of the application executed by the other processor maintains the remote count by hardware addressing.

12. The method of claim 11 wherein identifying the memory location by hardware addressing comprises identifying the memory location at which the memory associated with the corresponding process of the application executed by the other processor maintains the remote count by a PCIe address.

13. The method of claim 9 wherein processing the plurality of messages comprises operating the plurality of processors asynchronously due to clocking or operational differences.

14. The method of claim 9 wherein reflecting the local count comprises reflecting the local count in an asynchronous manner.

15. A computer program product configured to synchronize communications, the computer program product comprising a non-transitory computer readable medium having program code stored thereon, the program code comprising program code instructions configured, upon execution, to:

process a plurality of messages with each of one or more processes of one or more applications executed by each of a plurality of processors;

maintain a local count and at least one remote count in a memory associated with a respective process of an application executed by a respective processor, wherein the local count is representative of the message communicated to or from the respective process with which the respective memory is associated, and wherein the at least one remote count is representative of the message communicated to or from a corresponding process of an application executed by another one of the plurality of processors;

reflect the local count of the respective process to a remote count of the corresponding process; and cause the first process of a first application executed by a first processor to enter a delay period in an instance in which the local count and at least one remote count maintained by the memory associated with the first process fail to match.

16. The computer program product of claim 15 wherein the program code instructions configured to cause the first process to enter the delay period comprise program code instructions configured to cause the first process to enter the delay period in an instance in which the local count exceeds at least one remote count, and wherein the program code further comprises program code instructions configured to continue to process the plurality of messages with the first process in an instance in which the local count matches the remote count of the corresponding process.

17. The computer program product of claim 15 wherein the program code instructions configured to reflect the local count comprise program code instructions configured to identify a memory location at which the memory associated with the corresponding process of the application executed by the other processor maintains the remote count by hardware addressing.

18. The computer program product of claim 17 wherein the program code instructions configured to identify the memory location by hardware addressing comprise program code instructions configured to identify the memory location at which the memory associated with the corresponding process of the application executed by the other processor maintains the remote count by a PCIe address.

19. The computer program product of claim 15 wherein the program code instructions configured to process the plurality of messages comprise program code instructions configured to process the plurality of messages asynchronously relative to processing of the plurality of messages by other processors of the plurality of processors due to clocking or operational differences.

20. The computer program product of claim 15 wherein the program code instructions configured to reflect the local count comprise program code instructions configured to reflect the local count in an asynchronous manner.

* * * * *